United States Patent [19]

Hiroshi et al.

[11] 3,999,812
[45] Dec. 28, 1976

[54] BEARING MOUNTING

[75] Inventors: Sugano Hiroshi; Amano Ichiro, both of Nagasaki, Japan

[73] Assignee: Mitsubishi Jukogyo Kabushiki Kaisha, Tokyo, Japan

[22] Filed: June 25, 1975

[21] Appl. No.: 590,338

[52] U.S. Cl. .............................. 308/36.4; 308/187.1
[51] Int. Cl.[2] ........................................... F16C 1/24
[58] Field of Search ............ 308/15, 22, 36.4, 36.5, 308/106, 118, 168, 187, 219, 227, 187.1

[56] References Cited

UNITED STATES PATENTS

| | | | |
|---|---|---|---|
| 3,552,809 | 1/1971 | Owens | 308/36.4 |
| 3,608,987 | 1/1971 | Jordan | 308/187 |
| 3,679,277 | 7/1972 | Dohmen | 308/187.1 |
| 3,847,455 | 11/1974 | Vandermeulen et al. | 308/187.1 |

*Primary Examiner*—M. H. Wood, Jr.
*Assistant Examiner*—Gene A. Church
*Attorney, Agent, or Firm*—George B. Oujevolk

[57] ABSTRACT

For use with a machine including a wheel hub on a rotating shaft, moving-blade shafts secured to the hub and extended radially from the same, and fasteners on the moving-blade shafts, a bearing mounting for rotatably supporting each of the moving-blade shafts on the hub, characterized in that the wheel hub is formed with annular hollows of watertight design, each of which being open to an associated fastener on the hub facing the rotating shaft and accommodating a thrust roller bearing therein, and seals are located at the opening edges of each annular hollow in contact with the fastener.

2 Claims, 5 Drawing Figures

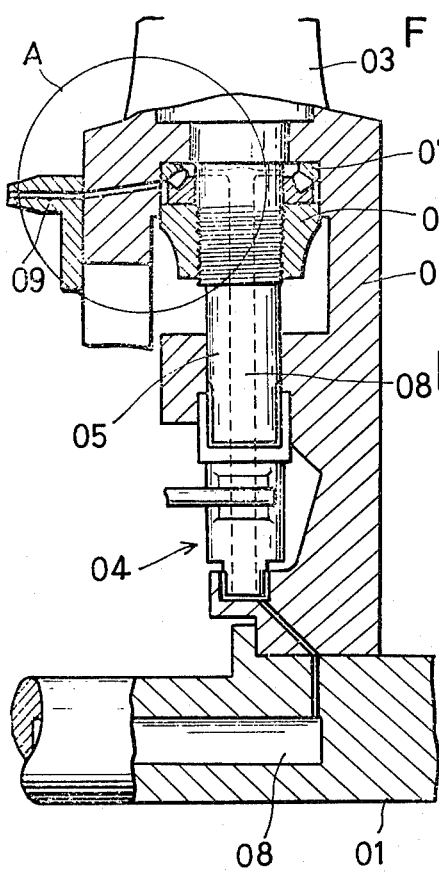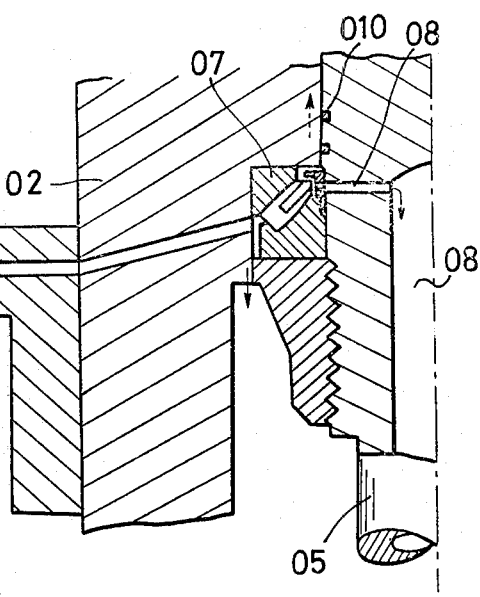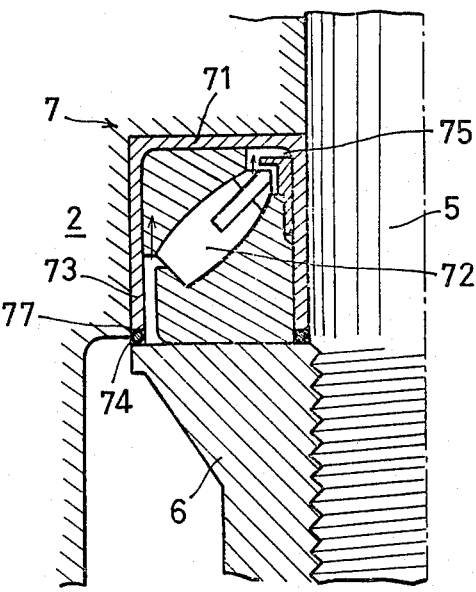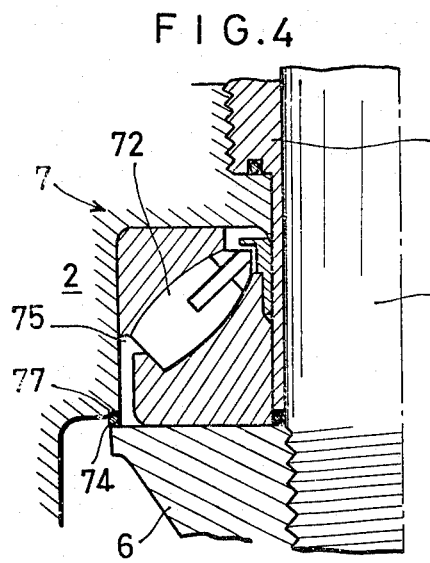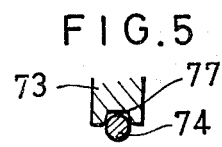

BEARING MOUNTING

This invention relates to a bearing mounting for axial-flow machines, such as axial fans, and more specifically to a device for preventing leakage of lubricant from the bearing.

By way of exemplification, the construction of a conventional movable-blade axial blower for use with a boiler is illustrated in FIG. 1, FIG. 2 being an enlarged cross section through the portion in the circle A of FIG. 1. In the arrangement shown, a rotating shaft or main shaft 01 has a wheel hub 02, which in turn carries moving blades 03. Each moving blade 03 has a shaft 05 inserted in the hub 02 and directed radially from the main shaft. Beneath the lower end of the moving-blade shaft 05 is located a driving mechanism 04 for rotating the same. A nut 06 in thread engagement with the blade shaft coacts with a thrust roller bearing 07 fitted between the nut and wheel hub to support the blade shaft rotatably with respect to the wheel hub. The bearing 07 is communicated with lubricant supply passages 08 extending in a continuous row from the main shaft 01 to the moving-blade shaft 05 so that grease is fed to the bearing 07 through the passages and then drained through a drain passage 09. The drain passage may normally be closed by a plug not shown. O-rings 010 for sealing are provided between the wheel hub 02 and the moving-blade shaft 05.

The conventional arrangement with the foregoing construction has disadvantages. As the centrifugal force produced by the rotation of the main shaft 01 acts on lubricant, a pressure differential develops between the inner and outer sides of the O-rings 010, causing leakage of the lubricant along the interface between the wheel hub 02 and the blade shaft 05, in the direction of a broken-line arrow in FIG. 2. The leaking lubricant eventually gets into the air stream and can cause fire if the jet of air is directed to a boiler or the like. The lubricant, which is always subjected to centrifugal force, tends to be separated into oily matter and additives and, when the main shaft is inoperative, the oily matter may by its own weight leak through the clearance close to the main shaft or flow back to the lubricant supply passage 08' (as indicated by fullline arrows in FIG. 2).

In view of the foregoing, it is a common practice to lubricate the machines of the character with grease during operation.

The present invention has for its object to eliminate those disadvantages of the prior art bearing arrangement and provide a bearing mounting which uses leakproof grease lubrication.

The above and other objects, advantages, and features of the invention will become more apparent from the following description when taken in conjunction with the accompanying drawing, wherein:

FIG. 1 is a fragmentary view of a conventional movable-blade axial blower, partly in section to show the internal construction;

FIG. 2 is an enlarged view of the portion in the circle A of FIG. 1;

FIG. 3 is a view corresponding to FIG. 2 but showing the essential parts of an embodiment of the invention;

FIG. 4 is a view also corresponding to FIG. 2 but showing the essential parts of another embodiment of the invention; and FIG. 5 is an enlarged sectional view of seal means provided at an edge of a bearing opening in accordance with the invention.

Referring to FIG. 3, a wheel hub 2 is fixedly mounted on a main shaft not shown, and a moving-blade shaft 5 is supported by the hub in the manner now to be described.

The moving-blade shaft 5 is in thread engagement with a nut 6, and a thrust roller bearing 7 is mounted between the nut 6 and the wheel hub 2. The bearing 7 can take the centrifugal force of the blade shaft 5 and of its blade due to the rotation of the main shaft.

An annular bearing cover 71, inverted-U-shaped in cross section, contains a thrust roller bearing 72 and is so disposed that its opening 73 is directed to the side close to the main shaft. Between grooves 77 at the end of the opening 73 facing the main shaft and the nut 6 are interposed O-rings 74, forming a watertight bearing chamber 75.

The operation of the bearing and related parts with the foregoing construction will now be explained.

As the main shaft rotates, the action of the centrifugal force upon the moving-blade shaft 5 and its blade is borne by the thrust roller bearing 72 via the nut 6. Grease sealed up in the bearing chamber 75 is urged by the centrifugal force radially of the main shaft (i.e., in the directions indicated by arrows in FIG. 3). This will cause no leakage, however, because the side of the bearing cover 71 distant from the axis of the main shaft is made watertight without the aid of any O-ring.

When the main shaft is stopped, the O-rings 74 located in the opening 73 of the bearing cover 71 to face the main shaft will act to establish perfect watertightness and shut off any grease leakage from the bearing chamber 75. The grease filled in the chamber may be replaced by fresh one at the time of periodic inspection.

Another embodiment of the invention will be described below with reference to FIG. 4, in which the parts like those in FIG. 3 are designated by like numerals.

In the second embodiment, an adapter sleeve 76 of a configuration such as is shown, in thread engagement with the wheel hub 2, is used in place of the bearing cover 71 in FIG. 3. At the front end of the sleeve 76 and also at the point of the wheel hub 2 facing the main shaft for contact with the nut 6, grooves 77 are formed to face the main shaft, and O-rings 74 are fitted therein to make the bearing chamber 75 liquidtight.

This second embodiment operates exactly in the same manner as does the first one.

With the construction and operation as described, the bearing mounting according to the invention offers the following advantages:

1. Since grooves are formed on the side of the bearing assembly close to the main shaft and facing the locking nut and O-rings are held in the grooves while the other side distant from the main shaft is covered by a watertight barrier, a completely liquidtight bearing chamber with no possibility of leakage of oily matter can be formed; when the bearing is subjected to the action of centrifugal force due to the rotation of the main shaft, the watertight barrier will work effectively, and when the shaft is inoperative the O-rings will work instead.

2. The leakproof (grease) lubrication precludes any imbalance in the weight of the bearing chamber, and hence no irregular vibration or any other trouble.

3. Complete prevention of lubricant leakage permits the provision of an enclosed bearing design which requires the replacement of old grease only at the time of periodic inspection. Therefore, the machining operation to provide the grease supply and drain passages and the like can be largely omitted and the construction simplified.

Although the fasteners on the moving-blade shafts 5 in the embodiments described are locking nuts 6, flanged slide fasteners may be employed instead.

Also, the grooves 77 provided to prevent the movement of the O-rings 74 are not always essential, and other seal rings may be used in place of the O-rings.

What is claimed is:

1. For use with a machine including a wheel hub mounted on a rotating shaft, moving-blade shafts inserted in the wheel hub radially of the same, and fasteners used on the moving-blade shafts, a bearing mounting located between the wheel hub and each of the fasteners to support each moving-blade shaft rotatably on the wheel hub, characterized in that the bearing mounting has a watertight hollow of annular contour facing the fastener of each moving-blade shaft and accommodating a thrust roller bearing therein, and is provided with seal means at the open edges of the annular hollow, in contact with the fastener and furthermore that an adapter sleeve is located between the moving-blade shaft, thrust roller bearing, and wheel hub, and seal means are provided at the front end of the sleeve and at the wheel hub in contact with the fastener.

2. A bearing mounting according to claim 1, characterized in that a bearing cover, inverted-U-shaped in cross section and accommodating the thrust roller bearing, is mounted in the annular hollow so that its opening faces the fastener, and seal means are provided at the open edges of the bearing cover in contact with the fastener.

* * * * *